Jan. 14, 1964     B. N. HOFFSTROM     3,117,557
EVAPORATORS
Filed April 21, 1961
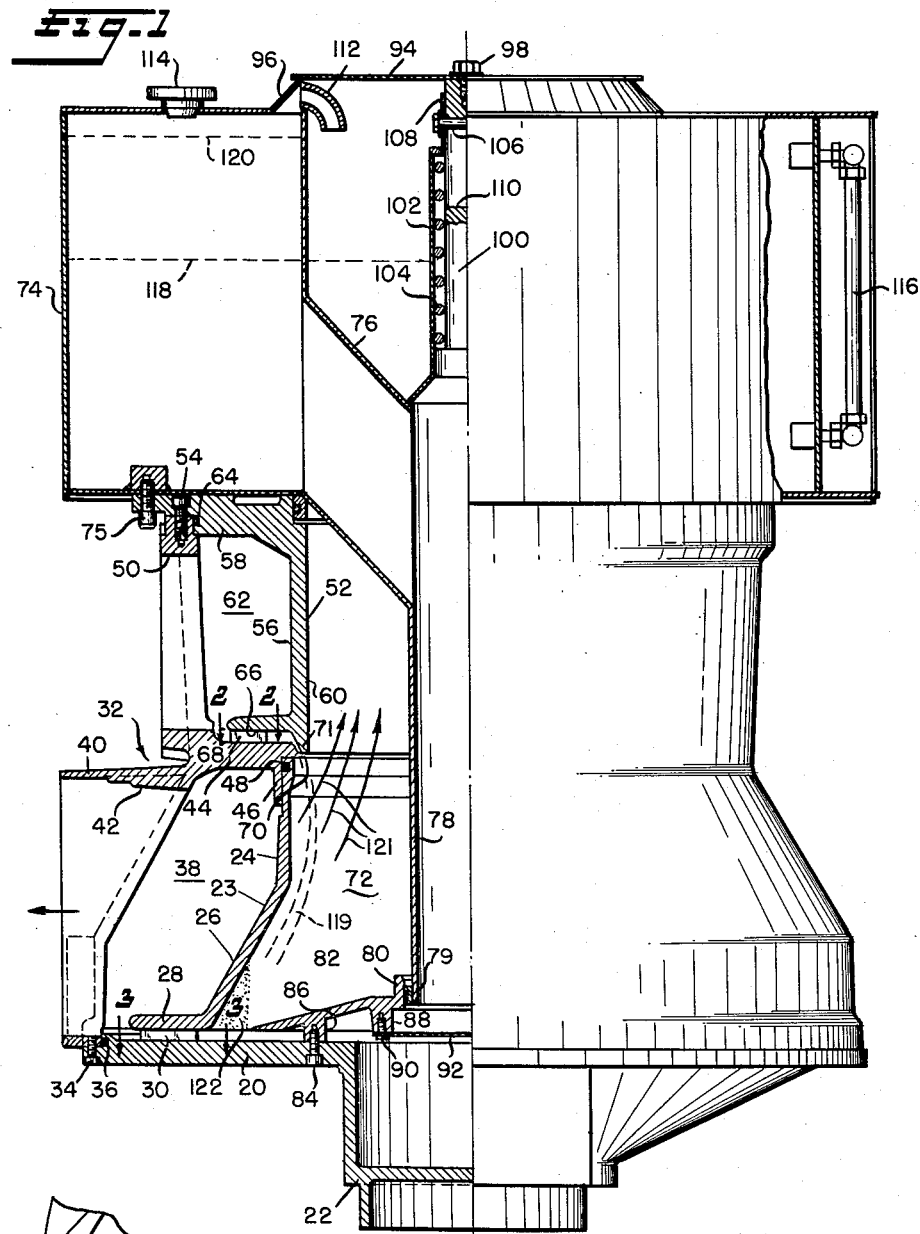
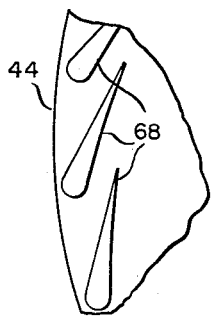
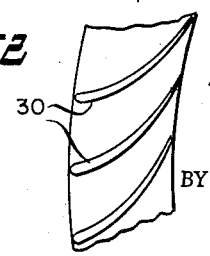
INVENTOR
Bo N. Hoffstrom
ATTORNEY

United States Patent Office 3,117,557
Patented Jan. 14, 1964

3,117,557
EVAPORATORS
Bo N. Hoffstrom, Santa Monica, Calif., assignor to Douglas Aircraft Company, Inc., Santa Monica, Calif.
Filed Apr. 21, 1961, Ser. No. 104,567
6 Claims. (Cl. 122—4)

This invention relates to evaporators and more particularly to evaporators which function without the addition of heat.

It is a principal purpose and object of the present invention to provide improved evaporators of this type having an extraordinarily high capacity for a given size.

It is also an object of the present invention to provide improved evaporators which function without the addition of heat and when used in conjunction with a suitable fluid supply system do not require any moving parts nor any separate power input.

It is a further object of the present invention to provide improved evaporators in which the evaporation occurs when the fluid is out of contact with any supporting surface thereby avoiding the problem of scaling associated with prior units.

It is a more specific object of the present invention to provide improved evaporators which may be used as a part of a closed fluid circuit, the evaporator receiving the fluid, reducing its pressure to effect evaporation of a portion of the fluid and returning the unevaporated portion of the fluid to the circuit at a lower pressure.

It is an additional object of the present invention to provide improved evaporators for use as a part of a closed fluid circuit, the evaporator including a fluid storage system operative automatically to replenish the fluid evaporated.

In attaining these and other objects, the present invention comprises apparatus including means for converting the pressure energy of the incoming stream of fluid to be evaporated to kinetic energy to create a revolving fluid vortex. The revolving body of fluid is passed through a restricted opening into an evaporation chamber where it forms a revolving axially moving curtain. As the fluid is fed into the evaporation chamber, the pressure drops instantaneously and a portion of the fluid curtain is instantaneously vaporized. The temperature of the remaining water drops to that corresponding to the pressure in the evaporation space which may be maintained at any desired level. Usually the pressure is only slightly above atmospheric pressure since the evaporation chamber may be open to the atmosphere. The rotation of the body of the fluid establishes a centrifugal field which significantly contributes to the efficiency of separation of the vapor from the remaining body of fluid and facilitates the release of large quantities of vapor in the relatively small space provided.

Additional objects and advantages will become apparent as the description proceeds in connection with the accompanying drawings in which:

FIGURE 1 is a front view of an evaporator constructed in accordance with the present invention, the righthand portion of FIGURE 1 being in elevation and the lefthand portion being in central vertical section; and FIGURES 2 and 3 are fragmentary enlarged sections taken along lines 2—2 and 3—3, respectively, of FIGURE 1 showing details of construction.

Referring now more particularly to the drawings, the evaporator assembly of the present invention is supported on a base plate 20 having a central depending boss 22 adapted for attachment to any suitable support (not shown). Cemented to or otherwise suitably secured to the base plate 20 is an annular sleeve member 23 having an upper essentially cylindrical section 24, and an intermediate conical surface 26 terminating at its lower end in an outwardly projecting flange 28. Milled from or otherwise formed integrally with the bottom surface of the flange 28 are a plurality of radial diffuser vanes 30, the bottom edges of which are in firm contact with the upper surface of the base plate 20.

A main housing member indicated generally at 32 is secured to the peripheral edge of the base plate 20 by a plurality of screws 34, the joint between the lower edge of the housing member 32 and the base plate 20 being sealed by an O-ring 36. The lower portion of the housing member is of generally conical configuration and forms with the inner sleeve member 23 an annular fluid collection space 38. At one circumferential location the conical wall of the housing member 32 is interrupted by a hollow boss 40, the hollow interior 42 of which forms a fluid outlet. The outlet is so proportioned that it has essentially the same area as the area of the annular passage through the diffuser vanes 30.

Adjacent its vertical midpoint, the housing member 32 is provided with an inwardly projecting radial flange 44 at the inner periphery of which is provided a downwardly projecting flange 46 having an inner cylindrical surface which fits closely over the corresponding surface of the upper end of the inner sleeve member. The joint between these two members is sealed by an O-ring 48. Above the flange 44, the housing member 32 is of generally cylindrical configuration and is provided with a fluid inlet opening 50 here shown in vertical alignment with the outlet opening 42.

The outer periphery of an upper inner sleeve member, indicated generally at 52, is secured to the upper end of the housing member 32 by a plurality of screws 54. The central cylindrical section 56 and the upper and lower radial flanges 58 and 60 of the sleeve member 52 form with the upper portion of the housing member 32 an annular fluid inlet chamber 62 which is sealed at its upper end by an O-ring 64. At its lower end the water inlet chamber 62 is in communication with the interior of the lower sleeve member through an annular channel 66 across which a plurality of tangential vanes 68 extend. Preferably the vanes are milled from the lower surface of the flange 60 and are cemented or pinned to the upper surface of the flange 44 on the main housing member 32.

At its inner end the channel 66 terminates in a downwardly directed fluid injection slot 70 formed between the curved inner edge of the flange 44 and a downwardly projecting lip 71 on the flange 60. As explained in detail below, the fluid to be evaporated flows through this slot into an evaporation chamber 72 bounded by the inner surface of the lower sleeve member 23.

Since, in the particular form shown, the evaporator is for use in a closed fluid circuit, it incorporates an automatic fluid replenishment system. This portion of the apparatus includes an annular fluid storage chamber 74 secured to the top of the flange 58 of the upper sleeve member 52 by a plurality of screws 75. The inner periphery of the fluid storage chamber 74 is connected by any suitable number, for example three, inclined conduits 76 to the interior of a central sheet metal tubular member 78. Preferably the conduits 76 are of streamlined configuration in cross-section to eliminate any substantial obstruction to the upward flow of vapors released in the evaporation space 72. The lower end of the central tube 78 carries a sealing ring 79 which fits within a central cylindrical flange 80 formed on an adapter plate 82 secured by screws 84 to the base plate 20, the screws extending into a plurality of circumferentially spaced bosses 86 in the adapter member. An annular inner ring of circumferentially spaced bosses 88 is formed on the lower surface of the adapter member 82 to receive screws 90 which retain a bottom cover plate 92. Thus the flow of fluid into or out of the bottom end of the tube 78 is confined to a radial path between the bosses 86 and 88.

The upper end of the evaporation chamber 72 is normally closed by a top cover plate 94 which rests on a conical lip 96 formed at the upper edge of the water storage chamber 74 and is rigidly attached by a screw 98 to the upper end of a piston 100 mounted for vertical sliding movement in a cylinder 102 which forms an extension of the fluid supply tube 78. The cover 94 is normally retained in its closed position by a spring 104. Upward movement of the cover plate is limited by a pin 106 carried by a reduced extension 108 of the cylinder 102 and extending through a transverse slot 110 in the piston 100. The cover 94 is for the purpose of preventing the entry of foreign objects into the interior of the apparatus and the spring 104 is sufficiently light to permit free upward movement of the cover under a slight differential pressure.

The space above the fluid in the chamber 74 is connected to the evaporation space 72 by a number of tubes 112 which effectively transmit the total pressure in the evaporation space. The apparatus is completed by accessories including a standard pressure relief cap 114 and a water level gauge 116.

The apparatus may be readied for operation by filling it with fluid, for example water, to approximately the level of the upper portion of the sight gauge 116 as shown by reference line 118 and connecting the inlet opening 50 to a suitable source of water at a temperature above 212° and under super-atmospheric pressure. The outlet 42 is connected to a return line leading back to the original source. In a typical application, the evaporator will be connected to the discharge and return lines of a hydrodynamic power absorbing device and the unit is then effective to maintain the temperature of the circulating water within allowable limits. When the associated dynamometer or other mechanism is not in operation, all of the apparatus below the level of reference line 118 will be filled with water.

When the associated hydrodynamic apparatus is in operation, water is forced in through the inlet passage 50 into the chamber 62 and thence past the tangential vanes 68 from which it emerges in a rapidly whirling vortex flow pattern. The water then passes through the slot 70 and forms a thin rapidly revolving curtain 119 which moves axially of the apparatus toward the base plate. The evaporation chamber is drained by the curtain which acts as a pump and surplus water is pushed back into the storage tank 74 so that its level reaches approximately the top of the sight gauge as shown by reference line 120 when the system has been properly filled. At the exit of the slot 70, the pressure drops instantly throughout the entire flow of water and in the curtain, part of it flashes into steam. Accordingly, the temperature of the remaining water drops to the saturated liquid temperature corresponding to the pressure in the evaporation space. Since this space communicates freely with the atmosphere through the freely openable top cover member 94, the pressure within the evaporation space 72 is only slightly above atmospheric. Thus the temperature of the water after it has passed through the evaporation space is only slightly above 212° F. The rotation of the curtain sets up a centrifugal field which materially aids in separating the steam from the water, the steam being lighter and passing to the inner surface of the curtain and proceeding in the direction of arrows 121 upwardly around the central tube 78. Because of this feature, very large quantities of steam can be released in the small space provided.

At the lower end of the curtain, the water re-forms into a "solid" ring as shown at 122. The angular momentum of the curtain is retained in this ring which therefore revolves and generates static pressure. The water in the ring then passes outwardly through the diffuser vanes 30 into the annular water collection chamber 38 for return to the apparatus through the outlet opening 42. As the water passes through the diffuser vanes, additional pressure is recovered and the water is returned to the hydrodynamic apparatus at a pressure high enough to prevent vaporization even after it reaches an elevated temperature which may be 285° F.

The evaporated water is replenished by flow of water from the storage tank 74 downwardly through the conduits 76 and 78 toward the water ring 122. The water is supplied to the region adjacent the outer rim of the adapter plate 82 with a slight pressure head. Since the water ring pressure must equalize the delivery head at delivery radius, the inner surface of the water ring 122 moves radially in or out to maintain balance. As water is consumed, the ring surface moves radially out. This reduces the static pressure at replenishing radius and allows water to flow from the storage tank into the water ring until balance is restored.

It is to be particularly noted that all of the evaporation occurs in the curtain of water when it is out of contact with any structural wall surface. This circumstance promotes the rapid and complete evaporation of the necessary portion of the water and contributes significantly to the efficiency and capacity of the apparatus. It has the further significant advantage of eliminating the deposit of mineral elements on the inner wall of the lower sleeve member 23.

While in the presently disclosed apparatus the steam is vented to atmosphere, it will be readily apparent that the energy of the steam can be utilized as desired. It can be stored, used for heating, or used to drive a turbine connected to a pump to increase the volume rate at which the fluid to be evaporated is supplied to the unit.

Also, it will be apparent that since the operation of the unit depends upon a sharp reduction of pressure at the outlet of the annular nozzle 70, this reduction in pressure can be effected by evacuating the evaporation space as well as by supplying fluid at superatmospheric pressure.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An evaporator for liquid supplied at a predetermined temperature and pressure comprising means forming an evaporation chamber in which the pressure is less than the pressure at which said liquid boils at said temperature, means forming an inlet chamber for said liquid adjacent a portion of said evaporation chamber, an inlet channel connecting said inlet chamber and said evaporation chamber, said channel extending around said evaporation chamber and terminating in an annular injection nozzle inclined with respect to the wall of said evaporation chamber to direct said liquid inwardly away from said wall and axially of said evaporation chamber, means in said channel for rapidly rotating the liquid passing therethrough whereby said liquid forms an annular revolving curtain moving axially of said evaporation chamber and spaced inwardly from said wall, the reduction in pressure in the entire body of said liquid as it passes out of said nozzle into said curtain causing a portion of said liquid to evaporate, and means providing separate outlets for the resulting vapors and the remaining liquid.

2. An evaporator for liquid supplied at a predetermined temperature and pressure comprising means forming an annular evaporation chamber having an outwardly diverging conical portion at one end, the pressure in said evaporation chamber being less than the pressure at which said liquid boils at said temperature, means forming an annular inlet chamber for said liquid adjacent the opposite end of said evaporation chamber, an annular channel connecting said inlet chamber and said opposite end of said evaporation chamber, said channel terminating in an annular injection nozzle inclined with respect to the wall of said chamber to direct said liquid inwardly away from said wall and axially of said chamber, a plurality of vanes in said channel for rapidly rotating the liquid passing through said channel whereby said liquid forms an annular revolving curtain moving axially of said evaporation chamber toward said conical end portion said curtain being spaced inwardly away from said wall, the reduction in pressure in the entire body of said liquid as it passes out of said nozzle causing a portion of said liquid to evaporate and the remaining portion of said liquid forming a solid ring along said conical portion of said evaporation chamber, means forming an annular outlet channel connecting the outer periphery of said ring to the exterior of said evaporator, and means providing a separate outlet for the evaporated liquid.

3. The apparatus according to claim 2 together with a liquid storage tank, and means including a conduit extending through said evaporation chamber for connecting said liquid storage tank to the inner periphery of said ring to replace the evaporated portion of said liquid.

4. An evaporator for liquid supplied at a predetermined temperature and pressure comprising means forming an evaporation chamber in which the pressure is less than the pressure at which said liquid boils at said temperature, means extending around the periphery of said evaporation chamber for introducing said liquid into said chamber in a rapidly rotating annular flow pattern directed away from the wall of said chamber whereby said liquid forms an annular revolving curtain moving axially of said evaporation chamber and spaced away from said wall, the reduction in pressure in the entire body of said liquid as it passes into said chamber causing a portion of said liquid to evaporate, and means providing separate outlets for the resulting vapors and the remaining liquid.

5. An evaporator for liquid supplied at a predetermined temperature and pressure comprising means forming an evaporation chamber in which the pressure is less than the pressure at which said liquid boils at said temperature, means extending around the periphery of said evaporation chamber for introducing said liquid into said chamber in a rapidly rotating annular flow pattern directed away from the wall of said chamber whereby said liquid forms an annular revolving curtain moving axially of said evaporation chamber and spaced away from the wall of said chamber, the reduction in pressure in the entire body of said liquid as it passes into said chamber causing a portion of said liquid to evaporate, means providing a substantially unrestricted outlet for the resulting vapors, means providing a separate outlet for the remaining liquid, and means in said separate outlet for increasing the pressure in said liquid as it passes therethrough.

6. An evaporator for liquid supplied at a predetermined temperature and pressure comprising means forming an annular evaporation chamber having an outwardly diverging conical wall portion at one end, the pressure in said evaporation chamber being less than the pressure at which said liquid boils at said temperature, means forming an annular inlet chamber for said liquid adjacent the opposite end of said evaporation chamber, an annular channel connecting said inlet chamber with said opposite end of said evaporation chamber, said channel terminating in an annular injection nozzle inclined with respect to the axis of said evaporation chamber to direct fluid inwardly of the wall of said chamber and axially of said chamber, means for rapidly rotating the liquid passing through said channel, whereby said liquid forms an annular revolving curtain moving axially of said evaporation chamber toward said conical end portion and spaced away from the wall of said chamber, the reduction in pressure in the entire body of liquid as it passes out of said nozzle causing a portion of said liquid to evaporate and the remaining portion of said liquid to form a ring along said conical wall portion of said evaporation chamber, means forming an annular outlet channel connecting the outer periphery of said ring to the exterior of said evaporator, means providing a separate outlet for said evaporated liquid, means independent of said channel to supply liquid to the inner periphery of said ring at a predetermined pressure whereby when the pressure in said ring is less than said predetermined pressure, said liquid will flow into said ring to thereby replenish the evaporated portion of said liquid.

References Cited in the file of this patent
UNITED STATES PATENTS

| | | |
|---|---|---|
| 567,646 | Allfree | Feb. 9, 1897 |
| 2,358,559 | Clemens | Sept. 19, 1944 |
| 2,992,977 | Greene et al. | July 18, 1961 |

FOREIGN PATENTS

| | | |
|---|---|---|
| 100,203 | Australia | July 27, 1935 |